United States Patent [19]

Middlebrooks

[11] Patent Number: 4,884,692
[45] Date of Patent: Dec. 5, 1989

[54] APPARATUS AND METHOD FOR STORAGE AND TRANSPORTATION OF 3.5 INCH FLOPPY DISKS

[76] Inventor: D. Weldon Middlebrooks, 405 Jefferson St., Arlington, Tex. 76012

[21] Appl. No.: 311,335

[22] Filed: Feb. 15, 1989

[51] Int. Cl.⁴ .................. B65D 85/30; B65B 23/00
[52] U.S. Cl. .................. 206/444; 206/523; 53/472; 220/22; 220/22.1
[58] Field of Search .......... 206/444, 523; 53/472; 220/22, 22.1

[56] References Cited

U.S. PATENT DOCUMENTS

| | | | |
|---|---|---|---|
| 2,695,112 | 11/1954 | Bonnevay | 220/22 |
| 4,093,010 | 6/1978 | Hunley et al. | 206/523 X |
| 4,106,597 | 8/1978 | Shook et al. | 206/523 X |
| 4,293,070 | 10/1981 | Ohlbach | 206/444 X |
| 4,781,423 | 11/1988 | Muenzer et al. | 220/22.1 |

FOREIGN PATENT DOCUMENTS

| | | | |
|---|---|---|---|
| 1091898 | 11/1954 | France | 220/22.1 |
| 895122 | 5/1962 | United Kingdom | 220/22.1 |

*Primary Examiner*—William Price
*Attorney, Agent, or Firm*—Charles W. McHugh

[57] ABSTRACT

A non-metallic and non-magnetic case for storing and/or transporting at least 200 and preferably over 300 floppy disks. The case is provided with a tray that contains filler blocks of foam that are configured so that individual blocks may be selectively removed and replaced with a quantity of floppy disks.

19 Claims, 2 Drawing Sheets

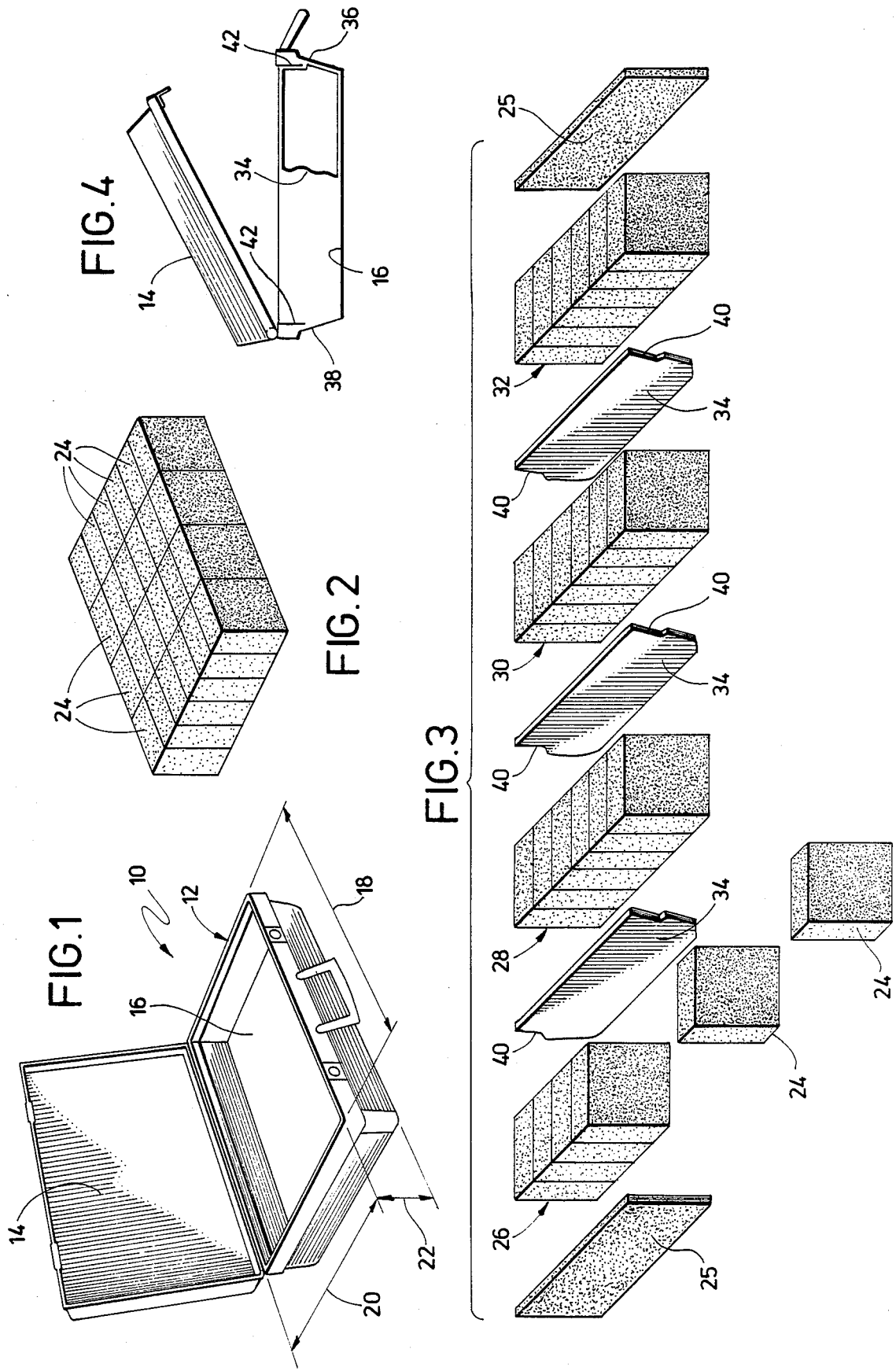

APPARATUS AND METHOD FOR STORAGE AND TRANSPORTATION OF 3.5 INCH FLOPPY DISKS

BACKGROUND OF THE INVENTION

This invention relates generally to storage cases for computer-related material; more specifically, it relates to a relatively large case which is adapted to hold as many as 320 3.5 inch floppy disks, or combinations of disks and associated materials-such as instruction manuals and the like.

The increasing popularity of the 3.5 inch floppy disk format for storing programs and data for computers has introduced the problem of organizing and efficiently storing those disks. Computers that use such disks are presently offered under brand names such Apple, IBM, Atari, Radio Shack (Tandy), NEC and others. Because this present generation of personal computers is usually much smaller (both in physical size and memory capacity) than many so-called "main-frame" computers, users frequently find it advantageous to have many floppy disks available for the optimum utilization of their computers. Depending upon the size of the disk collection or library that is to be created, it would not be unrealistic for a user to be faced with the task of organizing and storing well over 100 or even 200 disks.

Of course, there are some commercially available storage containers that are intended for storing 3.5 inch disks on a desktop or other horizontal surface, but such boxes or storage containers often hold fewer than 60 disks, and seldom are sized to hold as many as 100 disks. If an active computer user has as many as 300 floppy disks, it would be necessary to place five different storage boxes on a desk if each box held only 60 disks; and keeping up with which disk was stored in which box could easily become confusing. Furthermore, those floppy disk containers which are available seem to be designed solely for what may accurately be described as "static" storage—on a desk or shelf or the like—rather than for static storage at a given time and for transportation at another time. Expressed in other words, the storage cases for 3.5 inch disks that have been offered by others are not known to have handles, or restraining dividers, or cushions, etc., that would render those cases portable and safe for transporting disks.

It is also common for persons who energetically use their microcomputers to belong to clubs, associations and so-called "user groups," where they share experiences and knowledge with other users, and where they sometimes share programs that they have generated to accomplish certain tasks. The sharing of computer programs necessarily involves the exchange of disks or the transfer of information from one disk to another. Accordingly, it is not uncommon for members of a user's group to transport quite a bit, if not all, of their floppy disk library from their office or home to a remote location where some group is holding one of its periodic meetings. But a storage container for keeping a large quantity of floppy disks organized in a satisfactory manner in an office or home is not necessarily suitalbe for the handy and safe transportation of those disks back and forth to remote places.

Another very practical reason for wanting to be able to transport - as well as store—floppy disks is the need for physical security of the information contained on those disks when they are not actively being used. For example, a company's proprietary information, such as customer lists, accounts receivable, new product development, research results, etc., may be contained on disks that are readily available to employees during their traditional working hours. But when that information is not being used, it needs to be stored in a secure spot where it will be safe from misappropriation, or damage as a result of fire, water leakage, or accidental exposure to a stray magnet in a repairman's tool box, etc. It is advantageous, therefore, for many companies to have a convenient way of transferring large numbers of floppy disks back and forth from a safe and secure storage spot to a work station.

Besides the need to store large numbers of 3.5 inch disks in a convenient case which can either be kept in one location or transported to remote sites, it would also be advantagous to be able to carry at least some documents or ancillary computer equipment (such as a modem) from one site to another. On those occasions when a user does not need to carry a full complement of 300 or so disks, any extra space can be utilized for operator's manuals, instruction books, accessories, printed materials, etc. A storage and handling case which provides many different-sized, movable spacer-blocks avoids the limitations imposed by permanently-fixed dividers; and such a case is versatile enough to store fluctuating quantities of floppy disks and/or other computer-related materials of varying sizes and shapes. Thus, a single case can advantageously be used to fill a variety of needs. It is an object of this invention to provide such a versatile case, to that the case may be adapted to serve several purposes.

Another object is to provide a storage case having internal components which can be selectively left in place or removed in order to optimize the utility of the case.

These and other objects will be apparent from a careful reading of the specification and the claims appended thereto, and reference to the several figures of the drawing provided herewith.

DESCRIPTION OF THE FIGURES OF THE DRAWING

FIG. 1 is a perspective view of a combination storage and transportation case in accordance with this invention, the case being shown empty;

FIG. 2 is a perspective view of an assembly of filler blocks that have been fabricated in the shape of a rectangular parallelepiped;

FIG. 3 is an exploded view of all of the contents of a preferred embodiment of the invention, said contents being adapted to fit within the empty space of the tray-like box of the case shown in FIG. 1;

FIG. 4 is a partially cross-sectional end view of the case shown in FIG. 1, and showing a fragment of a rigid divider positioned within the case;

BRIEF DESCRIPTION OF THE INVENTION

Figure 5:
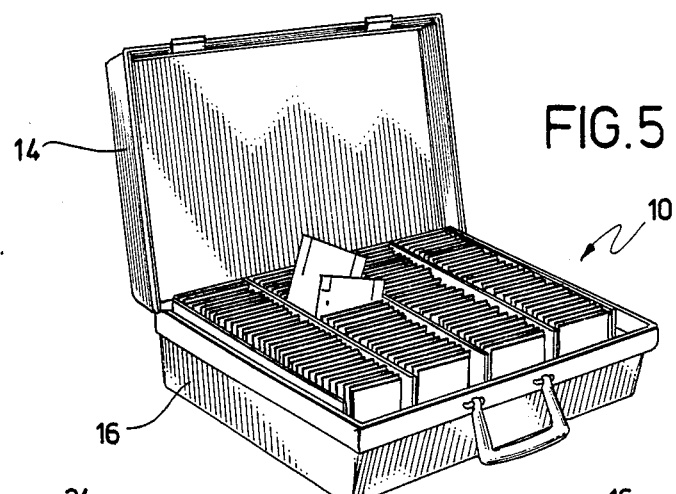
FIG. 5 is a perspective view of a carrying case in accordance with this invention and showing the case full of 3.5 inch floppy disks.
Figure 6:
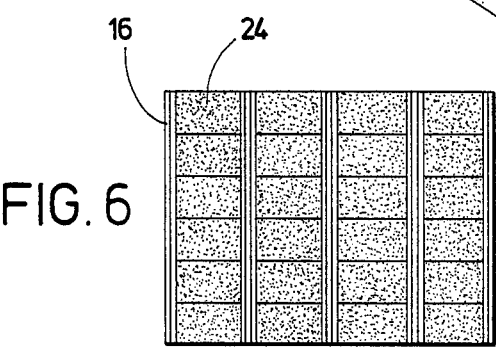
FIG. 6 is a top view of a tray as it would typically be seen as it comes from the manufacturer.
Figure 7:
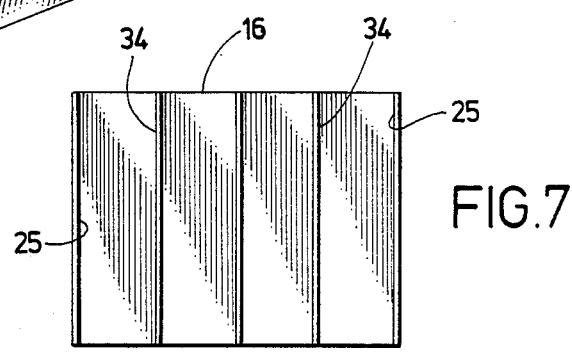
FIG. 7 is a top plan view of the same tray and showing the four columns of chunky filler blocks removed—to better illustrate the normal position for the three rigid dividers.
Figure 8:
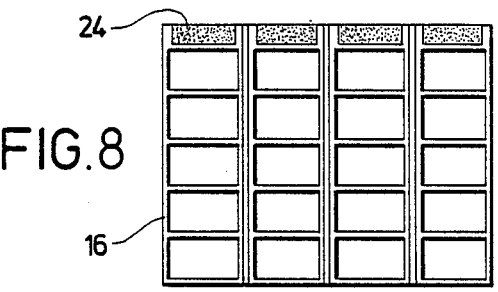
FIG. 8 is a top plan view of the tray showing twenty cartons inserted into the tray, said cartons being of the type in which ten 3.5 inch floppy disks are customarily sold.
Figure 9:
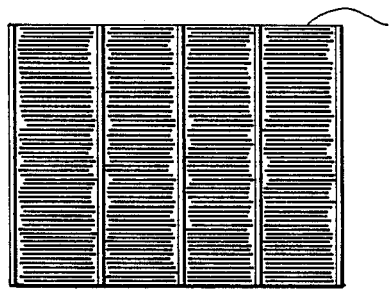
FIG. 9 is a top plan view of the tray showing its typical appearance when approximately 320 individual floppy disks are stored in the tray.
Figure 10:
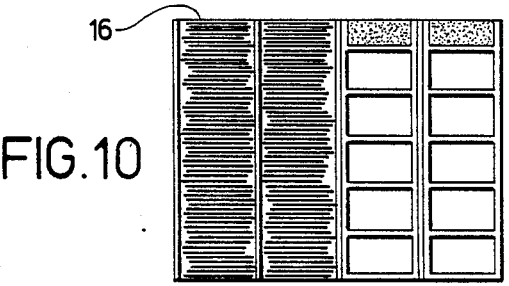
FIG. 10 is a top plan view of the tray showing a mixture of individually arranged floppy disks (on the left) and cartons for such disks (on the right)
Figure 11:
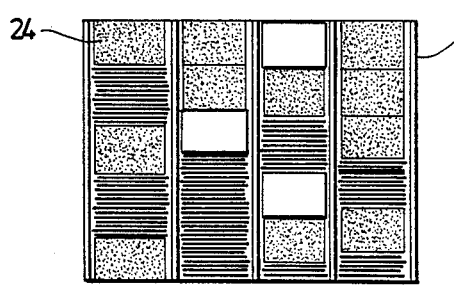
FIG. 11 is a top plan view of a tray showing a mixture of boxed disks and individual disks, segregated into different regions by filler blocks.
Figure 12:
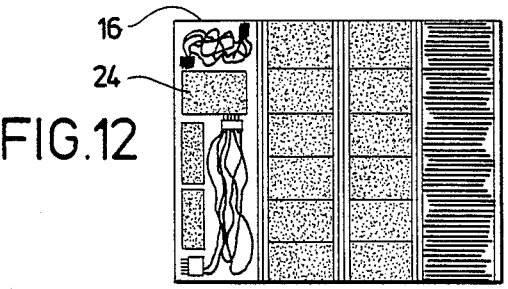
FIG. 12 is a top plan view of a tray having a single column of floppy disks and some exemplary computer hardware.
Figure 13:
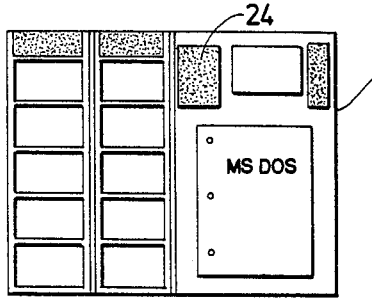
FIG. 13 is a top plan view of a tray showing a combination of floppy disks in cartons and various computer-related materials and hardware (on the right).

In brief, the invention disclosed herein includes an apparatus for either storage or transportation—or both—of a substantial quantity of floppy disks, said disks being commonly used in computers and generally described as 3.5 inch disks. The apparatus is sufficiently compact as to be capable of being stored on top of a desk or equivalent work station; but the preferred embodiment is large enough to hold at least 200—and preferably over 300—floppy disks, all of which are arranged in such a way as to be accessible and individually retrievable at a desired time.

The apparatus includes a non-metallic and non-magnetic case of molded plastic or the like, and having a lid and a box-like tray. Within the tray are initially provided a plurality of light-weight and resilient filler blocks. The filler blocks are preferably made of polyether foam having a density of about one pound per cubic foot. The blocks are sized to initially fill at least most of the internal space in the tray, and they are configured so that individual blocks may be selectively removed and replaced with a quantity of floppy disks. Ideally, the filler blocks are sized so that a single block can be removed for the purpose of accommodating up to fifteen disks. When more than fifteen disks are to be stored in the case, another block is removed, etc. The blocks are arranged in at least three and preferably four columns, and rigid dividers are provided to hold the disks in their respective columns, so that there is no risk that a given disk will become mislocated or disorganized, even though an optimally sized case might hold over 300 disks. Expressed in other words, the capacity of a case to hold many disks is relatively great; but there is never any significant empty space which would permit one or more disks to "float" or become lost in the relatively large tray.

By dividing the filler blocks into multiple, side-by-side columns and also providing pre-cut regions to foster easy separation of one filler block from another, there is a significant improvement in the versatility of the case—as far as storing disks, either loosely (i.e., individually) or as a group (i.e., segregating disks that contain related data in their original cartons or boxes), as well as storing other materials that may be of interest to the user. Such other materials may include instruction manuals for operating particular computer programs, or equipment such as an external disk drive, or reference materials such as printouts of clip art disks, etc. By the selective removal or re-arrangement of certain of the elements that are initially provided in a full case—including one or more flexible filler blocks or rigid dividers, the interior of the tray can be arranged to accommodate a wide variety of computer-related materials.

DETAILED DESCRIPTION OF A PREFERRED EMBODIMENT OF THE INVENTION

Referring initially to FIG. 1, the first major element of the apparatus 10 is a non-metallic and non-magnetic case 12, the case having a lid 14 and a box-like tray 16. A suitable material for the case 12 is high density polyethylene, which is durable and sturdy and lends itself well to the fabrication of integral hinges and latches that are not metallic. The tray 16 has an internal space with a width identified by the arrow 18, a length identified by the arrow 20 and a height identified by the arrow 22. It is believed that the internal space should be wide enough to accommodate at least three side-by-side columns of 3.5 inch floppy disks; in the preferred embodiment, the width 18 is about fifteen inches wide, so that four columns of 3.5 inch floppy disks may readily be stored in the case 12. By making the length (arrow 20) at least ten and one-half inches long, a given column of floppy disks may include 70 to 80 disks, depending on how tightly they are packed into the available space. The height (arrow 22) is ideally about 3.5 inches, so that a plurality of 3.5 inch disks can be placed in the tray in such a way that the disks are erect—and a frontal face of a disk will be visible when the user is in front of the case and looking generally downward into an uncovered tray. A label or other identifiying indicia on the front of a disk may therefore be examined by simply manipulating either a disk or one of the resilient filler blocks that is in the same column with the disk.

Referring next to FIG. 2, a plurality of light-weight and resilient filler blocks are sized to initially fill at least most of the internal space in the tray 16. The preferred material for the filler blocks is an open-celled foamed polyether having a density of about one pound per cubic foot. Other materials which are also non-magnetic and non-metallic and have acceptable characteristics are foamed polyester and foamed polyethylene. The preferred size for each of the filler blocks 24 is about 3.5 inches wide, about 3.5 inches high, and about 1.8 inches thick. For convenience in manufacturing, the filler blocks are advantageously cut from one large slab of foam with a die; but the cutting blades are configured so that they do not pass all the way through all portios of the foam slab when the slab is pressed down onto the die. By leaving intact very small sections of the original foam, a series of blocks 24 may be realized that are physically held together just enough that they may be handled as a unit or assembly. A plurality of such blocks 24 arranged so that the front of one block confronts the rear of the immediately adjacent block produces a series of blocks that may accurately described as a column. While there are links or connections (created by small portions of the original foam slab) between adjacent blocks 24 in a given column, those connections are sufficiently weak as to permit them to be torn or broken with a modest amount of manual force. Using such a design, a given block 24 may be physically separated from the remaining blocks in a column at any desired time without the need for any tools, etc.

Referring noxt to FIG. 3 (an exploded view of the initial contents of the case 12), the small, chunky filler blocks 24 are shown arranged into four columns that are identified by the numerals 26, 28, 30, 32. Furthermore, the optimum sizing of filler blocks for the interior of the case includes at least two relatively narrow blocks 25, each having a width of only about one-half inch and a length which is essentially the same as a full columns of blocks 24. For appearance if nothing else, it is desirable to fabricate all of the resilient blocks 24, 25 out of one single piece of foam material; and it is handy to arrange the die cuts in such a way that the two narrow blocks 25 are positioned at opposite sides of the initial piece of foam material. Using this technique, the narrow blocks 25 will have the same relative positon with respect to the chunky filler blocks 24 in both their original, prefabricated state and their "cut" state. This technique will also improve the cosmetic appearance of the filler blocks 24, 25 within a given case 12, because all of the blocks will have the same "grain" or cell orientation, and a greater uniformity of apperance will be achieved.

The main reason for having the tray space almost completely consumed by filler blocks 24, 25—at least initially—is to make possible the creation or relatively small storage spaces within a relatively large case 12, depending upon the number of floppy disks that are to be stored at any one time. For example, if a user starts off with a new case and has only eight or nine disks that are to be stored, the user would simply sever the narrow connections that hold a single filler block 24 to the adjacent blocks in a given column (e.g., column 26). Removing that single block 24 from the tray 16 will make it possible to store up to fifteen floppy disks in the newly created space. When more disks are to be stored, one or more additional filler blocks 14 are severed and removed, as required, to create the necessary amount of storage space. If the user wishes to store floppy disks in the original cardboard cartons (or boxes) in which they are commonly sold, this can be accomplished with the apparatus disclosed herein—even though said cartons are naturally wider than individual disks. The extra width that is necessary to accommodate boxed disks is readily available by removing one —or—both of the narrow side blocks 25 and making any necessary transverse adjustment in the position of the movable dividers (to be described). Additionally, the user may choose to store instruction manuals, reference materials of various kinds, hard copies of programs, and even certain computer devices (e.g., a modem) that will fit within a briefcase-sized carrier. This can be done by removing entire columns of blocks 24 and rigid dividers, or perhaps sliding some of them transversely within the tray 16, etc.

In its original, connected state, an assembly of all of the filler blocks 24 will be in the shape of a relatively large rectangular parallelepiped. But by the time that certain blocks have been broken away to produce columns, and then individual blocks 24 have been pulled away from one another and possibly reinserted into the case 12, the initial orderliness of the columns of blocks can begin to look less than perfect. To foster continued orderliness and the precise positioning and arrangement of disks and other things within the case 12, rigid dividers 34 are preferably provided between adjacent columns of filler blocks 24. Such rigid dividers 34 are advantageously configured so as to be stable and freestanding when positioned on a horizontal surface, so that a divider is upright and resting on its lower edge, as indicated in FIG. 3. A preferred material for the rigid dividers 34 is a sheet of acrylic plastic about ⅜ inch thick. When a divider 34 has a generally flat lower edge, it can be rested on this lower edge in such a way as to be relatively stable. And when a divider 34 is formed of acrylic plastic, it will be neat and clean in appearance as well as non-metallic and non-magnetic, which are properties that also characterize the case 12 and the filler blocks 24. Furthermore, the case 12 and all of its initial contents will be washable, in the event that someone should accidently drop a case on the floor and then become concerned about picking up some dust along with a retrieved case. Also, fabricating all of the case components and fillers of non-metallic materials helps reduce the risk of having any data accidentally erased by virtue of placing a disk in the case. Such a potential risk might aris if some case component were made of metal and that metal should somehow be subjected to a strong magnetic field and become magnetized. Those skilled in the art will appreciate that any metallic element that can be magnetized constitutes a potential threat to any magnetic media that is placed near the metallic element.

The preferred length for a rigid divider 34 is essentially as great as the length of the case 12; and it is also preferred that there be some means for precluding the dividers from being lifted vertically out of a tray 16 after the dividers have been installed between adjacent filler blocks 24. One technique for accomplishing this result is represented in FIGS. 3 and 4, wherein the two ends of the rigid dividers 34 each have a non-planar configuration that is complementary to a pair of irregular shapes on the interior walls of the tray front 36 and the tray rear 38. The two ends of each divider 34 have recesses 40 that match a protruding lip 42 on an interior wall of the case 12, so that the divider cannot be pulled upward and past a protruding lip when the divider is perpendicular to an interior wall. Also, the tops of the tray walls and the bottom edges of the lid may be provided with a tongue and groove configuration, in order that dust may be precluded from entering the closed case 12 when it is carried out into an imperfect world.

The method of using the combination storage and transportation apparatus disclosed herein comprises providing a generally rigid and non-magnetic case 12 of suitable size and placing it on some horizontal surface such as a desk. Integrally molded latches for the lid 14 are then released so that the lid can be raised in order to expose the tray 16 and its contents. Ideally, the integrally molded hinges along the rear wall of the case 12 are such as to permit the lid 14 to rotate fully backward with respect to the tray 16—by 180 degrees, so that all of the contents of the case are visible at one time. Assuming that the filler blocks are to be obtained from a single rectangular parallelepiped of polyether foam (that has been suitably die cut), the filler blocks 24 are then segregated into the four columns 26, 28, 30, 32. The connection between the narrow, side filler block 25 and the blocks in column 26 is left intact, so that these particular blocks may be initially inserted—as a unit—into the empty tray 16. Next, a first one of the rigid dividers 34 is placed within the tray 16 in an upright mode and then rotated until the recesses 40 can be brought into confronting relation with prepared ridges 42 on the inside of the case 12. When this happens, the divider 34 will be essentially parallel to the first column of filler blocks and perpendicular to both the front and rear walls of the case. The divider 34 will then be moved transversely as far as necessary in order to bring it close to the first column 26.

Next, a second set of filler blocks 24 (in column 28) is pushed downward into the tray, using whatever force is necessary to slightly compress the blocks. This is because the total length of the blocks in the columns will typically be just slightly longer than the gap between the front and the rear of the tray 16. Therefore, a very slight compressing action will usually be necessary in order to insert any given column of blocks into the tray; and the column will thereby be gently held in essentially whatever position it has been manually placed.

Another rigid divider 34 is then positioned in the tray and locked in place where it will serve as a separator between columns 28 and 30. The third rigid divider 34 is then placed in the tray 16, and the fourth and last column 32 of foamed plastic blocks 24 is inserted, along with the remaining narrow block 25, to essentially fill the interior of the tray. Adding a foam cushion in the lid 14 will help ensure that anything which is put into the tray will be cushioned from the front, rear and top—and will not be susceptible to bouncing around loosely within the case 12. However, the density of any such "lid" cushion must be relatively low, i.e., on the order of about one pound per cubic foot, in order to ensure that it will not impose any untoward load on the tray's contents as the lid is closed and locked. A soft cushion will also accommodate any indexing tabs that a user might insert and which might protrude above the general plane that is defined by the tops of the disks. Because the lid cushion performs a significantly different function than does a filler block, the lid cushion does not need to be removable from the case 12 in the same manner as a filler block.

As filler blocks 24 are selectively removed from the case in order to meet the need for storage space for floppy disks (on an as-needed basis), the removed blocks should not be discarded. Instead, the removed blocks 24 should be set aside in a location so that they will be out of the way but near enough to permit their re-insertion into the tray if and when they are again needed. The removed filler blocks 24 are also very handy as a non-abrasive wiper for a computer display screen, as well as a cushion for cables or other computer devices that a user may choose to store in the case 12 or any other carrying case. If the user wants to store some books or instruction manuals in the case 12, but there are not enough printed materials to fill up the space created by removing vertically oriented blocks 24, then putting the blocks back in the case with a horizontal orientation will hold the printed materials in place and prevent them from experiencing any random motion within the case—even when the case is switched back and for the from a horizontal orientation to a vertical orientation. When the filler blocks 24 have been completely removed and floppy disks have been inserted into the created space, an open case 12 will look like the one shown in FIG. 5, with two exemplary floppy disks being shown as partially inserted into the tray 16.

To perhaps better communicate to the reader the versatility of the apparatus 10 disclosed herein, a series of almost schematic representations of trays 16 are shown in FIGS. 6–13, including various combinations of filler blocks, individual disks, boxes for disks, manuals, computer hardware, cables, etc. The variety of arrangements that are possible with the apparatus disclosed herein should be apparent from these fiew exemplary views, especially those that show both the presence and absence-as a particular situation dictates—of resilient filler blocks, rigid column dividers, and narrow side pieces, etc. Attention is also directed to the fact that the chunky filler blocks 24 need not remain fully expanded at all times; that is, they need not appear in their working mode in the same size that they appear when they are relaxed, as shown in FIG. 3. When the blocks 24 are fabricated of one-pound polyether foam (which has an Indentation Load Deflection rating of 30), the blocks can readily be compressed to about one-fourth of their original size. At least some compression is being represented by the "thin" blocks shown at the tops of FIGS. 8 and 10. If needed, the preferred foam filler blocks can be cut with an electric carving knife to create special shapes and sizes for help in guarding against any possible vibration or shock to certain equipment during the transportation thereof. It should also be remembered that the loose filler blocks may be given more than one orientationwith a tray; that is, the blocks are stable in essentially any orientation in which they can be placed, incuding vertical and horizontal, etc. Therefore, it is hoped that these several views will make it apparent to those skilled in the art that the concept disclosed herein is not intended to be limited by the few examples that have been given. It is assumed that others will appreciate that other modifications could be made, and that the invention should therefore be measured only by the scope of the attached claims.

What is claimed is:

1. An apparatus for the storage of and, if needed, the transportation of a substantial quantity of floppy computer disks which are generally described as 3.5 inch disks, comprising:

(a) a non-metallic and non-magnetic case having a lid and a box-like tray, and the tray having an internal space with a width, a length and a height, said internal space being wide enough to accommodate at least three side-by-side columns of 3.5 inch floppy disks, and said internal space being at least ten inches long so as to accommodate columns of at least 70 floppy disks, and said space being about 3.7 inches high, whereby a plurality of 3.5 inch floppy disks can be placed in said internal space in such a manner that they are erect;

(b) a plurality of resilient filler blocks that are non-metallic and non-magnetic and are sized to initially fill at least most of the internal space in said tray, said blocks being arranged into at least three columns, and the blocks in at least a given column being interconnected, and the connections between adjacent blocks being sufficiently strong as to render a given column of interconnected blocks susceptible to being handled as a unit-while at the same time the connections between the blocks are sufficiently weak as to permit easy breakage of one or more of the connections in order that a given block may be separated from the remaining blocks in a columns, whereby a given block may be removed and replaced with a quantity of floppy disks, and whereby several filler blocks may be removed and replaced with anyone or more of the things selected from the group consisting of floppy disks, manuals, printed reference materials, hard copies and selected computer devices; and (c) a plurality of rigid dividers, each of which is adapted to be positioed between two adjacent columns of filler blocks so as to foster the orderly alignment of filler blocks within the tray's internal space, said dividers also fostering the orderly arrangement of any disks or other materials that may have selectively replaced one or more blocks in the internal space, and the dividers also be non-metallic and non-magnetic.

2. The apparatus as claimed in claim 1 wherein the filler blocks are made of resilient foam having a density within the range of about 1 to 2 pounds per cubic foot.

3. The apparatus as claimed in claim 1 wherein the lid is hinged so as to be permanently connected to the tray, and the hinge is configured in such a way that the lid is capable of being rotated fully backward with respect to the tray by 180 degrees, and the entire interior of the case is accessible when the lid has been rotated by 180 degrees to its full-back position.

4. The apparatus as claimed in claim 3 wherein the case is molded of polyethylene and the hinge is formed from interconnnecting elements that are integrally molded with the case.

5. The apparatus as claimed in claim 1 wherein the filler blocks are shaped as rectangular parallelepipeds and are oriented into four side-by-side columns, and the width of each column is about 3.5 inches.

6. The apparatus as claimed in claim 1 wherein the rigid dividers are formed from sheets of acrylic plastic about ⅜ inch thick and the dividers have a generally flat lower edge that is perpendicular to the two faces of the sheet, whereby the dividers may be rendered stable when they are balanced on their lower edges.

7. The apparatus as claimed in claim 1 and further including means for precluding the dividers from being lifted vertically out of a tray after the dividers have been installed so that they are between adjacent columns of filler blocks.

8. The apparatus as claimed in claim 1 wherein each of the dividers has two ends, and each of the two ends has a non-planar configuration that is adapted to engage an irregular shape on an interior wall of the tray.

9. The apparatus as claimed in claim 8 wherein the two ends of the dividers each have a recess, and the recess in each end matches the shape of a protruding lip on an interior wall of the case.

10. The apparatus as claimed in claim 1 wherein there are four columns of filler blocks in a case, each of which columns has a length of approximately 11 inches, whereby up to 320 floppy disks may be inserted into the case in the space created by the removal of the filler blocks, and whereby floppy disks may be progressively added to the case as the blocks are successively removed.

11. The apparatus as claimed in claim 1 wherein the filler blocks are formed from polyether foam having a density of about one pound per cubic foot.

12. The apparatus as claimed in claim 1 wherein the filler blocks are made from foamed material selected from the group including polyether, polyester, and polyethylene.

13. The method of storing and, when desired, transporting a large quantity of 3.5 inch floppy disks, comprising the steps of:
(a) providing a generally rigid and non-magnetic case having a storage tray which includes a bottom and upstanding sidewalls and both a front and a back, said tray defining an interior for the storage of computer disks that are commonly described as 3.5 inch floppy disks, and said case also having a lid which is designed to cover the tray and which is selectively openable to expose the interior of the tray and its contents;
(b) initially filling substantially all of the interior of the tray with resilient filler blocks;
(c) selectively removing from the tray only as many filler blocks as are necessary to meet the immediate need for storage space for floppy disks, such that the removal of filler blocks is accomplished on a when-space-is needed basis; and
(d) subsequently inserting floppy disks into the space that is created by removing one or more filler blocks, such that at all times the interior of the tray is substantially full of a combination of filler blocks and floppy disks, whereby any floppy disks that have been placed in a case are prevented from bouncing around loosely in the relatively large interior of a case, and whereby the maximum envelope within which a floppy disk can be moved within a case is equal to the size of a single filler block.

14. The method as claimed in claim 13 wherein the filler blocks are configured as both wide and narrow blocks, and the width of the wide blocks is about 3.5 inches, and the width of the narrow blocks is about 0.5 inch, and wherein only the wide blocks are removed from the interior of the tray when it is desired to store floppy disks within the case on an individual basis, and wherein both wide and narrow blocks are removed to provide more lateral space in the tray when it is desired to store floppy disks within the case in the original cardboard boxes in which they were shipped from a manufacturer.

15. The method as claimed in claim 13 wherein the lid is hinged to the case along the back of the tray, and wherein there is a handle affixed to the front of the case, and including the further step of closing the lid to securely capture all of the floppy disks and filler blocks within the case while the tray is essentially horizontal, and then rotating the case to a vertical orientation so that the case may be manually carried by gripping the handle.

16. The method as claimed in claim 13 wherein the filler blocks are initially connected together in such a way that the connected blocks may be physically handled as a unit, and including the further step of manually severing the connection between one or more blocks as additional storage space is needed for floppy disks within the case.

17. The method as claimed in claim 13 and including the furthe rstep of selectively replacing any filler blocks that have been previously removed from the storage case whenever enough floppy disks have been removed so that sufficient space has been created to accommodate a filler block such that the entire space within a case will be normally maintained full of either floppy disks, filler blocks, or other space-consuming materials.

18. The method as claimed in claim 13 and including the further step of removing one or more rigid dividers along with a necessary quantity of filler blocks in order to create a relatively wide space in the tray for accommodating items that are wider than floppy disks.

19. The method as claimed in claim 13 wherien a handle is provided near the front edge of the case, and the case having a flat side so that the tray may rest in a generally horizontal mode in such a way that the floppy disks cannot fall out of the tray, and including the further step of closing the lid and turning the case 90 degrees when the case is to be carried, such that the handle is presented at the top-most part of the case when the case is vertically oriented.

* * * * *